United States Patent [19]
Doughty et al.

[11] 3,957,524
[45] May 18, 1976

[54] CATIONIC BITUMINOUS EMULSIONS

[75] Inventors: Joseph B. Doughty, Sullivans Island; Peter Dilling, Charleston, both of S.C.

[73] Assignee: Westvaco Corporation, New York, N.Y.

[22] Filed: Feb. 25, 1974

[21] Appl. No.: 445,066

[52] U.S. Cl. ............................ 106/277; 106/283; 252/311.5
[51] Int. Cl.$^2$ .................... C08K 5/19; C08L 95/00
[58] Field of Search ........................ 106/277, 283; 252/311.5

[56] References Cited
UNITED STATES PATENTS

| | | | |
|---|---|---|---|
| 2,547,965 | 4/1951 | Olin ............................... | 260/567.6 |
| 3,050,468 | 8/1962 | Wright ............................ | 106/277 X |
| 3,276,886 | 10/1966 | Pitchford ........................ | 106/277 |
| 3,418,249 | 12/1968 | Pitchford ........................ | 106/277 X |

*Primary Examiner*—Joan E. Welcome
*Attorney, Agent, or Firm*—Richard L. Schmalz; Ernest B. Lipscomb, III

[57] ABSTRACT

There is disclosed herein oil-in-water cationic bituminous emulsions of improved mechanical stability for mixing grade emulsions comprising, from about 30 to about 80% by weight bitumen, from 0.1 to about 10.0% by weight of a water-soluble quaternary amine of the reaction of epichlorohydrin, trimethylamine and an alkyl phenol, for example, nonyl phenol and dodecyl phenol, as the cationic active emulsifier for the bitumen and the remainder water. A marked degree of control is attainable over the break time and coating characteristics of coated aggregates by varying the amount of emulsifier. Additionally, auxiliary emulsifiers may be added to tailor the emulsions to the amount of fines or types of aggregates with which the emulsion may be used.

6 Claims, No Drawings

CATIONIC BITUMINOUS EMULSIONS

BACKGROUND OF THE INVENTION

1. Field of the Invention

This invention relates to aqueous cationic bituminous emulsions as mixing-grade emulsions. More particularly, it relates to oil-in-water-type cationic bituminous emulsions having improved mechanical stability emulsified with quaternary amines formed from the reaction of an alkyl phenol, epichlorohydrin and trimethylamine as the cation active emulsifier.

Mixing-grade oil-in-water bituminous emulsions, in which asphalt or similar bituminous material is emulsified in water by conventional emulsifiers, are extensively used to coat loose aggregate, such as stone, gravel and the like, in the construction and surfacing of roads, parking lots and other applications. The mixing-grade oil-in-water bituminous emulsions, which are employed to prepare the aggregate-containing mixes, must, therefore, be specially formulated to permit easy handling and ready application. The emulsions must remain stable (not set on initial contact) on being mixed with the aggregate; but once applied to the surface being paved or constructed, the emulsion should dehydrate satisfactorily at a predetermined rate (e.g., rapid set, medium set, or slow set, depending upon the use) and should display thorough penetration and firm adhesion of the bituminous binder to the aggregate.

2. The Prior Art

Cationic bituminous emulsions have come into use and obviate many of the disadvantages of the earlier used anionic emulsions. Cationic bituminous emulsions, e.g., asphalt-in-water emulsions, are formed by agitation of melted asphalt in water with the aid of cation-active emulsifiers which are either dissolved in the water employed for emulsification, or are dispersed in the asphalt phase before the emulsification, or yet emulsification may be carried out in situ. In contract to the anionic emulsions, bituminous emulsions formulated using cationic emulsifiers do not "set" in the same manner as anionic emulsions, but rather the bituminous material is deposited on the surface of the aggregate from the emulsion due to the attraction of polar charges between the bituminous droplets and negatively charged aggregate surfaces. Thus, cationic bituminous emulsions deposit more rapidly than the anionic bituminous emulsions on the aggregate surfaces and are bonded to the aggregate by the electrostatic action at the interface of the bitumen and the aggregative material. Control of the setting action of cationic bituminous emulsions is of considerable importance in road building and other applications. Due to the charge attraction mechanism, the rapidity of deposition of bituminous materials from the cationic emulsion is closely related to the generally negatively charged surface of the aggregate or filler material. While a specific cationic bituminous emulsion might provide suitable properties for use in conjunction with some aggregates, the same cationic emulsion may not exhibit suitable properties with others; thus, the ability to attain control of set times and coating characteristic is quite advantageous in obtaining an emulsion having wide applicability.

With the change from anionic asphalt emulsions to cationic asphalt emulsions several attempts have been set forth in the prior art for providing satisfactory cationic aqueous bituminous emulsions. Among those disclosed is U.S. Pat. No. 3,126,350 to Borgfeldt which discloses as a cationic emulsifier, a lignin amine product. Gzemski et al. in U.S. Pat. No. 3,518,101 disclose an emulsifier for oil-in-water emulsions which includes a diamine. Subsequently, other amines were disclosed in the prior art as cationic emulsifiers, such as those mono-quaternary and/or di-quaternary ammonium emulsifiers disclosed in U.S. Pat. No. 3,764,359 to Dybalski for slurry seal formulations. This list is intended to be exemplary only and does not represent the state of the art.

Therefore, it is a general object of this invention to provide a mixing-grade, oil-in-water bituminous emulsion.

Another object of this invention is to provide a cationic bituminous emulsion for mixing with aggregates whose coating characteristics and set time can be varied.

A further object of this invention is to provide a cationic quaternary amine emulsifier for bituminous emulsions for an aggregate mixture in which the rate of deposit after being applied to the surface to be treated may be controlled by the amount of emulsifier added and is workable for a period of time long enough to enable application in slurry form.

Still another object of this invention is to provide a new cationic quaternary amine emulsifier.

Other objects, features, and advantages of this invention will be evident from the foregoing disclosure.

DETAILED DESCRIPTION OF THE INVENTION

It has been found that cationic asphalt emulsions capable of producing satisfactory stable aggregate mixes may be prepared with the aid of certain quaternary amines of alkyl phenols having an alkyl radical from 8 to 20 carbons, such as nonyl phenol and dodecyl phenol, as effective cationic emulsifiers for emulsifying asphalt-in-water.

In preparing the bituminous emulsions of this invention, an aqueous cationic emulsifying solution prepared as described hereinbelow, is intimately contacted with a suitable bitumen by a mixing device, such as a colloid mill, which is capable of producing a vigorous shearing action. The bitumen content of the emulsion can range from about 30 to about 80% by weight of the emulsion depending upon the intended use. The quaternary amine of alkyl phenol emulsifier is present in the final emulsion in a concentration ranging from about 0.1 to about 10.0% by weight of the emulsion, preferably about 0.3 to 1.0% by weight of the emulsion, water making up the balance of the emulsion to 100% by weight. Particularly satisfactory for mixing-grades are those emulsions having an asphalt content from about 55 to about 65% by weight. In contrast to some other cationic emulsifiers, adequate stability on mixing is achieved in a pH range of 3 to 6, with the optimum being around pH 4.

The "bitumen" used in the emulsion may be derived from Venezuela, mid-continent, western and other sources and also includes bitumen, natural asphalt, petroleum oil, still residues of paving grade, plastic residues from cold tar distillation, petroleum pitch, petroleum resins, solutions of such substances like cut-back asphalt, and the like. Practically any asphalt with penetration values ranging from about 40 to about 300 may be emulsified with the aid of the quaternary amine emulsifiers of this invention.

The cationic emulsifiers of this invention are made by forming a quaternary dodecyl phenol amine (Q.D.P.A.) or a quaternary nonyl phenol amine (Q.N.P.A.). The quaternary amine is the reaction product of epichlorohydrin, trimethylamine, or triethylamine, and an alkyl phenol, such as octyl phenol, dodecyl phenol or nonyl phenol. One process for making the quaternary amines is taught in U.S. Pat. No. 2,547,965 to Olin. The quaternization of the alkyl phenol may be carried out in a solvent, such as methanol, ethanol, isopropanol, ethylene glycol or other suitable solvent. A portion of the solvent may be replaced by using up to 25% by weight of water of the solvent for the reaction. The molar amount of alkyl phenol to quaternized epichlorohydrin may range from 1:1.5 to 1:1. The quaternary amine of alkyl phenol may be formed at high solids with the remainder being solvent or solvent/water. The alkyl phenol, methanol, water and epichlorohydrin are added together and stirred well. The four components form a clear solution. The trialkylamine is then added, and the temperature kept between 45°C. and 65°C. for about 1 to 8 hours. The resultant product when using trimethylamine and triethylamine is 3-(dodecyl phenoxy)-2 hydroxypropyl trimethyl ammonium chloride and 3-(dodecyl phenoxy)-2 hydroxypropyl triethyl ammonium chloride, respectively. In order to achieve improved aggregate coating results using Q.D.P.A. as an asphalt emulsifier, it is preferable to minimize the inorganic salts in the formulation.

The quaternary amine, resulting from the reaction of alkyl phenol, trimethylamine and epichlorohydrin, is normally added to the water in which the asphalt will be emulsified and the pH of the solution is adjusted to a value of about 4.0. The pH adjustment is effected by adding a suitable acid, for instance, hydrochloric, acetic, phosphoric, and the like. Thereafter, the emulsion of asphalt-in-water is formed in the conventional manner, agitating the combined phases (water and asphalt) in a suitable piece of equipment, such as a colloid mill.

As the quaternary alkyl phenol is a good emulsifier, other auxiliary emulsifiers are not usually needed. However, on occasion it may be desirable to alter the performance of the quaternary alkyl phenol, i.e., pumping time, fines, or change the setting time. When desirable, known conventional, compatible additives may be employed in small amounts. These compatible additives include auxiliary cationic or non-anionic emulsifiers. The concentration of these auxiliary emulsifiers will generally lie in the range of from 0.01 to about 2.0% by weight. Thus, a non-anionic emulsifier, for instance, one of the ethylene glycol polyethers sold in the trade under the trademark designation of "Igepals" may be added. In some instances, cationic auxiliary emulsifiers can be added, for instance, N-alkyl trimethylene diamine in the group of materials known in the trade under the trademark designation of "Duomeens", or yet an alkyl-substituted imidazoline sold under the trademark designation "Nalcamines."

After the emulsion has been prepared in the hereinbefore described manner, it may be either stored until it is required at, and transported to, the job site; or it may be mixed with the aggregate corresponding to the intended application at a central plant in a large pugmill or a cement-mixer; or yet it may be taken immediately to the job site to be mixed there with the aggregate in available motorized mixing equipment or even manually, in the absence of such equipment.

The practice of this invention may be seen in the foregoing examples wherein the cationic quaternary amine emulsifier was used to illustrate its advantages in a cationic bituminous emulsion. In each of the examples, the tests were performed according to ASTM D-244.

EXAMPLE 1

The quaternary dodecyl phenol amine (Q.D.P.A.) and quaternary nonyl phenol amine (Q.N.P.A.) performed well as cationic emulsifiers for Venezuelan asphalt (120/150 penetration value). The emulsions had a medium brown color and creamy texture, both indicative of good emulsions. The emulsifier dosages were varied from 0.5 to 1.0 percent, and the pH was adjusted to 4.0 with hydrochloric acid. A qualitative microscopic particle size evaluation of this emulsion indicated that about 90 percent of the particles had diameters less than 10 microns, with about 60 percent being 4 – 6 microns. The formulations and test data are given in Table I.

At 0.5 and 0.75 percent, the Q.D.P.A. containing asphalt made rapid set emulsions as determined by cement and by aggregate coating tests. The asphalt at a 1 percent emulsifier level formed a medium set emulsion as determined by aggregate mixing test and was stable enough to be pumped for 60 minutes. The Q.N.P.A. containing asphalt also made a good emulsion.

TABLE I

FORMULATION AND EVALUATION OF ASPHALT EMULSIFIED WITH VARIED AMOUNTS OF DODECYL PHENOL QUATERNARY AMINE

| | Emulsion No. | | | |
|---|---|---|---|---|
| Materials | 1 | 2 | 3 | 3A |
| Percent Emulsifier | 0.5 | 0.75 | 1.0 | 1.0 |
| Water, ml | 474.0 | 471.0 | 468.0 | |
| Alkyl Phenol Amine Quaternary $^1$, g | 6.0 | 9.0 | 12.0 | |
| HCl, 4N, ml (adjusted to pH 4.0 | 0.2 | 0.3 | 0.1 | |
| Asphalt, 120/150 Pen., Venezuelan, g | 720.0 | 720.0 | 720.0 | |
| Properties | | | | |
| Evaporation Residue, % | 61.4 | 59.6 | 61.6 | 61.5 |
| 20 Mesh Sieve Residue, % | None | None | None | None |
| Cement Test | Broke | Broke | Broke | Broke |
| Type of Set | Rapid | Rapid | Medium | Rapid |
| Viscosity, Sec. at 77°F. | 29.0 | 21.0 | 23.0 | 23.0 |
| Particle Charge | Positive | Positive | Positive | — |

TABLE I-continued
FORMULATION AND EVALUATION OF ASPHALT EMULSIFIED WITH VARIED AMOUNTS OF DODECYL PHENOL QUATERNARY AMINE

| Materials | Emulsion No. 1 | 2 | 3 | 3A |
|---|---|---|---|---|
| Percent Emulsifier | 0.5 | 0.75 | 1.0 | 1.0 |
| Pumpability at 300 RPM, Min. | 0 | 0 | 60.0 | — |

Note: [1]Emulsions No. 1–3 were Q.D.P.A.; Emulsion No. 3A was Q.N.P.A.

EXAMPLE 2

The versatility and control of the aggregate coating characteristics utilizing the quaternary dodecyl phenol amine as the emulsifier are illustrated in Table II.

Evaluation of the asphalt emulsion properties (evaporation residue, viscosity, sediment, etc.) indicates only minor changes as the solvent system for making the emulsifier is altered demonstrating the good emulsification capability of the quaternary dodecyl phenol amine. However, the granite aggregate coating results (all at an emulsifier concentration of 0.3 percent) are different for the Q.D.P.A. samples prepared in the various solvent systems. The visually estimated coating results of emulsions 6, 10 and 11 are virtually the same indicating that at constant emulsifier concentration (0.3 percent) the variation in solvent media (methanol-water, isopropanol-water) has little effect on the coating as expressed by the percentage of aggregate coated for selected times after the initial mixing of asphalt emulsion and granite. The faster set indicated by the higher percentage coating at identical times for emulsion 4 as compared to emulsion 6 indicates the coating variation observed when samples are prepared under identical conditions but reacted in methanol versus a methanol-water mixture. A comparison of emulsion 6 with emulsion 10, both prepared in an 85:15 mixture of methanol-water, but at reactant mole ratios of 1.1 and 1.5, respectively, demonstrates that no differences in granite coating are observed indicating that ratios of epichlorohydrin-trimethylamine to dodecyl phenol higher than 1.1 do not significantly affect aggregate coating.

The set and coating behavior of Q.D.P.A. emulsified asphalt systems on both granite and limestone are shown for variations in emulsifier concentration. Irrespective of the different reaction conditions shown in Table II (reactant mole ratios, solvent, reaction time, sample size, etc.) an increase in the emulsifier concentration always resulted in a slower set on aggregate (lower percentage coating at corresponding times). The results on granite are certainly conclusive; however, the effect of variations in emulsifier concentration are strongly illustrated in the case of a faster setting, more difficult to coat aggregate such as limestone.

The results indicate that the preparative variations between the Q.D.P.A. batches in emulsions 7, 9 and 10 do not significantly affect the coating characteristics and the set time (time for 100 percent coating) is less than 15 minutes for all three samples. In the case of emulsion 8, a further increase in emulsifier concentration to 0.8 percent extends the set time to between 15 and 30 minutes. The data in Table II suggests that a considerable degree of control can be achieved in aggregate coating using Q.D.P.A. emulsified asphalt systems and that it should be possible to tailor the emulsifier concentration to give the desired coating characteristics for a given asphalt and aggregate system. It also appears that further addition of the emulsifier to a formed emulsion could be utilized to slow down the emulsion set in order to coat a difficult aggregate and not necessitate the preparation of a second emulsion.

TABLE II
ASPHALT EMULSION AGGREGATE COATING FOR VARIOUS CONCENTRATIONS OF QUATERNARY DODECYL PHENOL AMINE EMULSIFIER

| Emulsion No. | Reactant[1] Mole Ratio | Reaction Time Hrs. | Solvent Media | Solids (%) | Emulsifier Conc. (%) | Aggregate Coating[2] Granite (Min.) | | | | Limestone (Min.) | | | |
|---|---|---|---|---|---|---|---|---|---|---|---|---|---|
| | | | | | | 0 | 15 | 30 | 60 | 0 | 15 | 30 | 60 |
| 4 | 1.1 | 8 | MeOH | 80 | 0.30 | 50 | 80 | 80 | 100 | | — | | |
| 5 | 1.1 | 8 | MeOH | 80 | 0.55 | 20 | 40 | 50 | 100 | | — | | |
| 6 | 1.1 | 7 | 85:15 MeOH:H$_2$O | 80 | 0.30 | 5 | 15 | 20 | 50 | | — | | |
| 7 | 1.1 | 8 | 85:15 MeOH:H$_2$O | 80 | 0.50 | | — | | | 15 | 100 | 100 | 100 |
| 8 | 1.1 | 8 | 85:15 MeOH:H$_2$O | 80 | 0.80 | | — | | | 10 | 45 | 100 | 100 |
| 9 | 1.0 | 6 | 85:15 MeOH:H$_2$O | 80 | 0.50 | 0 | 10 | 25 | 60 | 5 | 100 | 100 | 100 |
| 10 | 1.5 | 8 | 85:15 MeOH:H$_2$O | 75 | 0.30 | 10 | 15 | 40 | 70 | 10 | 100 | 100 | 100 |
| 11 | 1.5 | 6 | 85:15 IPA:H$_2$O | 54 | 0.30 | 95 | 100 | 100 | 100 | | — | | |

Notes: [1]Moles epichlorohydrin and trimethylamine per mole dodecyl phenol.
[2]Percent aggregate coating by asphalt emulsion at various times after initial mix.

EXAMPLE 3

The marked control over the emulsion set time and coating properties by altering the Q.D.P.A. emulsifier concentration suggests the possibility that secondary additives to the emulsion system might accomplish the same goal. Experiments along these lines are given in Table III, demonstrating the effect of adding an ethoxolated nonyl phenol (Igepal CO-890) to a quaternary dodecyl phenol amine (Q.D.P.A.) emulsified asphalt system. The epichlorohydrin and trimethylamine were at 1:1 mole ratio with the dodecyl amine, and the Q.D.P.A. at 80 percent solids was reacted for 8 hours in methanol:water (85:15).

The emulsion properties (particle size, viscosity, evaporation residue, etc.) of all these emulsions were all very similar. The addition of ethoxolated nonyl phenol (Igepal CO-890) in sufficient quantities to Q.D.P.A. extends the set time and coating characteristics of the asphalt emulsion. The results in Table III indicate that a 1:19 ratio of Igepal CO-890 to Q.D.P.A. (emulsions 13 and 14) is sufficient to noticeably lengthen the set time on limestone aggregate. An increase in the Igepal CO-890:Q.D.P.A. ratio to 1:9 results in a further lengthening of the setting time (emulsion 15) as compared to emulsions 13 and 14. The inclusion of an auxiliary non-anionic emulsifier into formulations with Q.D.P.A. produces asphalt emulsions with equivalent setting time and coating characteristics on limestone as asphalt emulsions prepared with an identical quantity of Q.D.P.A. These results indicate additional versatility of the Q.D.P.A. emulsifier system enabling marked control of the aggregate setting and coating characteristics to be achieved.

TABLE III

ASPHALT EMULSION AGGREGATE COATING RESULTS FOR VARIOUS COMBINATIONS OF ADDITIVES WITH Q.D.P.A.

| Emulsion No. | Additive Conc. (%) Igepal CO-890 | Q.D.P.A. Conc. (%) | [1]Aggregate Coating Limestone (Min.) | | | |
|---|---|---|---|---|---|---|
| | | | 0 | 15 | 30 | 60 |
| 12 | (0.010) | 0.49 | 10 | 100 | 100 | 100 |
| 13 | (0.015) | 0.285 | 5 | 100 | 100 | 100 |
| 14 | (0.025) | 0.48 | 5 | 50 | 100 | 100 |
| 15 | (0.050) | 0.45 | 5 | 30 | 50 | 100 |
| 8 | — | 0.80 | 10 | 45 | 100 | 100 |

Notes: [1]Percent aggregate coated by the emulsion at various times after initial mix.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A cationic bituminous emulsion for mixing grade compositions which consists essentially of,
   a. from about 30 to about 80% by weight of bitumen;
   b. from about 0.1 to about 10.0% by weight of the emulsion of an emulsifier from the group consisting essentially of 3-(dodecyl phenoxy)-2 hydroxypropyl trimethyl ammonium chloride and 3-(dodecyl phenoxy)-2 hydroxypropyl triethyl ammonium chloride; and
   c. the remainder being water, whereby the amount of said emulsifier is varied depending upon whether a slow, medium, or fast set emulsion is desired.

2. The cationic bituminous emulsion as defined in claim 1, wherein said bitumen is asphalt.

3. The cationic bituminous emulsion as defined in claim 1, wherein said bitumen is present in an amount from 55 to 65% by weight.

4. The cationic bituminous emulsion as defined in claim 1, wherein said quaternary amine is present in an amount from 0.3 to 1.0% by weight.

5. A cationic bituminous emulsion for mixing grade compositions which consists essentially of,
   a. from about 30 to about 80% by weight of the emulsion of bitumen;
   b. from about 0.1 to about 10% by weight of the emulsion of an emulsifier from the group consisting essentially of 3-(dodecyl phenoxy)-2 hydroxypropyl trimethyl ammonium chloride and 3-(dodecyl phenoxy)-2 hydroxypropyl triethyl ammonium chloride;
   c. from 0.01 to 2.0% by weight of the emulsion of an auxiliary emulsifier from the group consisting essentially of non-anionic and cationic emulsifiers; and
   d. the remainder being water, whereby the amount of said emulsifier is varied depending upon whether a slow, medium, or fast set emulsion is desired.

6. The cationic emulsion as defined in claim 5, wherein said auxiliary emulsifier is an ethylene glycol polyether.

* * * * *